Sept. 25, 1956  A. E. WILDE  2,764,431
CASING-HEAD ADAPTER FLANGE
Filed Dec. 5, 1952

A. E. Wilde,
INVENTOR;
Frederick E. Maynard
Atty.

United States Patent Office 2,764,431
Patented Sept. 25, 1956

2,764,431

CASING-HEAD ADAPTER FLANGE

Arthur E. Wilde, Yorba Linda, Calif., assignor to Shaffer Tool Works, Brea, Calif., a corporation of California Application December 5, 1952, Serial No. 324,222

2 Claims. (Cl. 285—415)

This invention is a differentiated-spool fitting adapter flange-forming ring for casing-heads or the like.

Casing-heads are used in the deep well industry for fixation onto well casing at the bottom end of the head and for reception of various tubular fittings, for instance of spools onto which are bolted well apparatus like control gates, for example.

Since the spools may differ one from the other in many details, like size of bolt holes, or diameter of the ring of bolt holes, or the number of bolt holes in the base flange of the spool it has heretofore been necessary to dismount an applied casing-head from the casing and place on another if a change of differentiated spools is to be made.

It is an object of this invention to provide a casing-head and flange-ring assembly which will enable the quick and easy preparation of a given head for application of one or another of a variety of fittings to the casing-head; for instance of a given spool selected from a group varying in some detail or details, as suggested just hereabove. It being understood that the spool assembly may be made before or after installation of the said head on casing hung or in place in a well.

An object is to provide a simple, practical, low cost, threadless flange-forming ring applicable to a given head in a ready and fast manner which eliminates screw of the flange ring onto the head, and provides a safe and rigid connection between the ring and the head, and needs the setting of only a few bolts to effect fixation of the ring.

Also, an intent of the invention gives an adapting flange-ring composed of a plurality of identical segments for low manufacturing cost and stock supply as to each kind of ring for ordinary service demands.

The invention resides in certain advancements in the art of coupling up tubular members of apparatus assembly, the example here shown being deep well equipment, as set forth in the ensuing disclosure and has with the above additional objects and advantages as hereinafter developed, and whose constructions, combinations and detail of means will be made manifest, with the manner of operation, in the following description of the herewith illustrative embodiment; it being understood that modifications, variations, adaptations and equivalents may be resorted to within the scope, spirit and principles of the invention as claimed in conclusion hereof.

Figure 1:
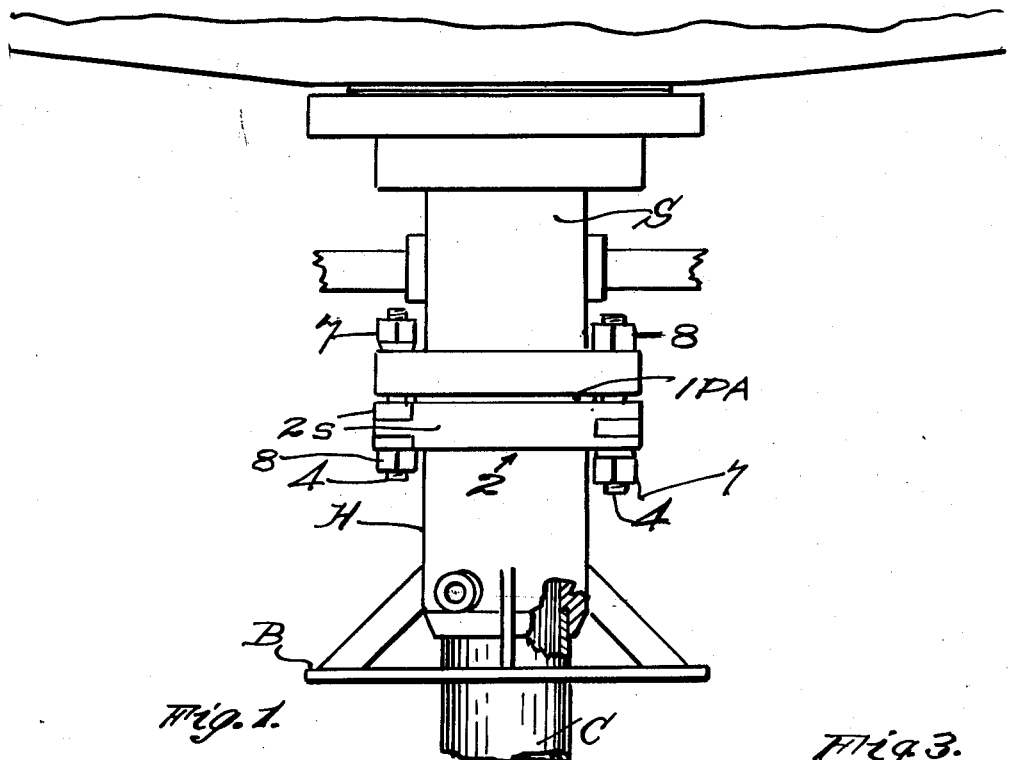
Figures 2, 3:
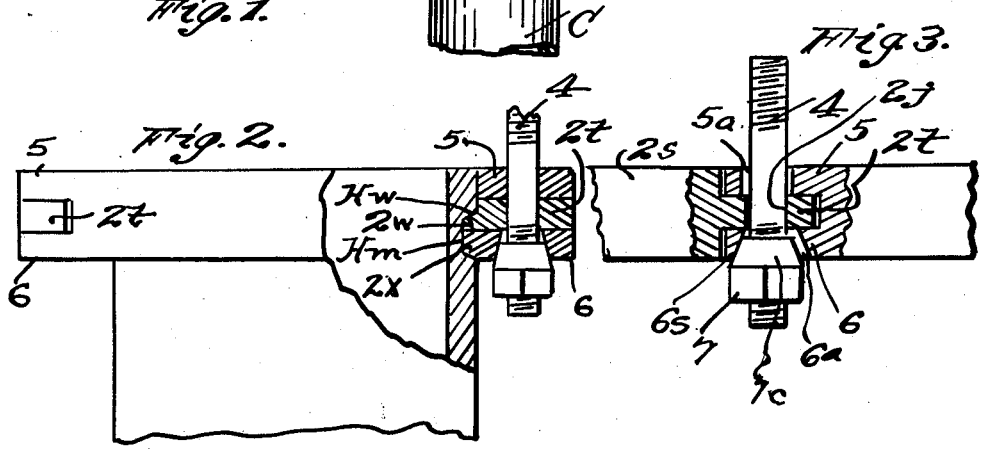
Figure 4:
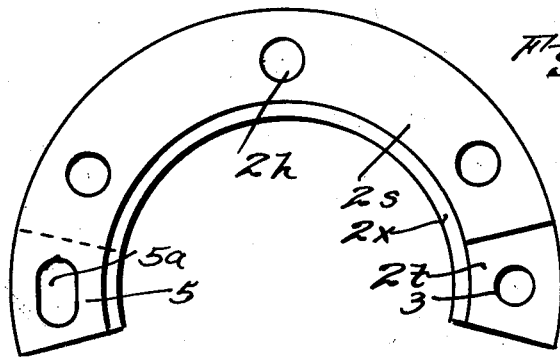

Figure 1 is a side elevation of the invention in combination with well-installed casing. Figure 2 is a sectional detail of the head and ring assembly. Figure 3 is a detail section of inter-bolted and jammed meeting ends of ring segments. Fig. 4 is a plan view of a ring segment.

The top end of well casing C is shown welded in the lower end of the body of a casing-head H which has an annular base B.

Heads H in general use have, usually, an integral bolting up flange. The instant invention eliminates the integral flange and in its stead there is here provided an attachable flange forming ring 2 made up of a suitable number of segments 2s which have top-to-bottom holes 2h for bolts whereby to fasten to a selected tubular element, here being a make-up spool S, a number of which are available and each differing in assembling features in some way.

The mutual ends of the segments are tongue-and-grooved together removably, the tongues 2t having, each, a central bolt hole 3 to readily receive a top-to-bottom bolt 4. The slot ears 5 and 6 of each segment are perforated to take the bolt 4.

It is highly desirable that the ring segments be rigidly connected one to the other and that the ring per se be solidly jammed onto the body of the head H; for practicability. Therefore, in this disclosure, the ear 5 has an aperture 5a considerably larger than the utilized bolt, for relative side shift, and the ear 6 has a hole 6a large enough to receive a clamping bolt nut 7; the holes 3, 5a and 6a being generally in alinement for insertion of the bolt. To effect jamming of the tongue 2t and the slotted end of its mutual segment the nut 7 is provided with a conical top end 7c going into the hole 6a and this hole has an outwardly inclined seat 6s complementary to the nut cone with the result that as the nut is screwed up onto the bolt, Fig. 3, the cone engages the seat 6s and thrusts the bolt laterally so that it is jammed at one side, as at 2j in the tongue hole 3. Therefore the series of segments can be very rigidly bolted in a circle about the relative casing head.

Further, to effect the jamming of the assembled flange ring 2 onto the body of the casing head H and its interkeying with said body the latter has a peripheral mortise Hm near its top end, Fig. 2, and the ring 2 has a tenon portion 2t matching said mortise and being clinched therein when the several ring bolts 4 are set tight. The mortise has at least one outwardly inclined side wall as at Hw engaged by a complementary surface 2w so that there is a solid wedging effect of the applied ring in the mortise.

In assembly of a cellar equipment make-up if a change of spools S seems necessary it is only required to unbolt the then mounted spool, or at the beginning apply a desired specified spool, and remove the unwanted spool from the ring 2 and remove the mounted ring from the installed casing head H. Then a selected type ring 2 complementary to a given spool which is to be applied, is clamped in place on the casing head H and the new spool is bolted on.

Both the top and the bottom side walls of the mortise Hm in the body of the head H are here shown as outwardly bevelled for safe wedging of the flange ring 2. After the flange ring 2 has been clinched onto the head H then the take up nuts 8 are severally set tight to draw the bottom of the spool s with equal pressure all around on the metallic packing API resting on the top and of the head H.

What is claimed is:

1. A new article of manufacture for the purpose set forth and comprising, in combination: a casing-head spool-fitting body having, near one end, a peripheral groove with flaring walls, a plurality of ring clamp segments each having a bifurcated end and a tongue end whereby the segments can be interjointed, to form a complete flange on said body, and having internal tenons with wedge edges fitting said groove and complementing the flared walls of said groove, said tongues having holes, complementary bolts, and said bifurcated ends including upper and lower spaced ears to receive the inserted tongues, the upper ears having slots in which the bolts can shift and the lower ears having holes with wedge faces, and nuts, for the bolts, each having a conical shoulder to engage said wedge faces when the nuts are tightened to set the bolts and thereby complete the attachment of the adapter flange to its mounting body ready for attachment of a head spool.

2. In an adapter for attachment in an external annular groove in a casing, said groove having outwardly flared end walls: a flange comprising a plurality of arcuate segments which together define a contractable annular ring, each segment having a bifurcated end comprising a pair of transversely spaced ears, and a tongue at the opposite end receivable between said ears of the bifurcated end of the adjacent segment, said segments comprising a contractable ring, and each segment having tenons with wedge edges receivable in said groove and complementing the flared walls of said groove, said tongues having a hole therethrough, one of the ears of each bifurcated end having a slot and the opposite ear having a hole which tapers inwardly to provide a wedge face, the holes and slots of the segments being aligned when the tongues are received between the ears of said bifurcated ends; bolts in said holes and slots; and a nut for each bolt, having a frusto-conical shoulder, said nuts engageable with the wedge faces of the holes in said ears when the nuts are tightened to thereby effect contraction of said flange.

References Cited in the file of this patent

UNITED STATES PATENTS

| | | |
|---|---|---|
| 626,223 | Cramp | June 6, 1899 |
| 696,603 | Smith | Apr. 1, 1902 |
| 750,428 | Boyce | Jan. 26, 1904 |
| 1,020,929 | Row | Mar. 19, 1912 |
| 1,179,091 | Gray et al. | Apr. 11, 1916 |
| 1,389,282 | Yingling | Aug. 30, 1921 |
| 1,456,761 | Beylund | May 29, 1923 |
| 2,412,418 | Obermaier | Dec. 10, 1946 |
| 2,461,856 | Tornberg | Feb. 15, 1949 |
| 2,558,695 | Unger | June 26, 1951 |

FOREIGN PATENTS

| | | |
|---|---|---|
| 1,682 | Great Britain | June 11, 1870 |
| 14,892 | Great Britain | Aug. 3, 1894 |